United States Patent
Wise

[19]

[11] Patent Number: 6,144,323
[45] Date of Patent: Nov. 7, 2000

[54] METHOD AND APPARATUS FOR DECODING VIDEO DATA

[75] Inventor: Adrian Wise, Bracknell, United Kingdom

[73] Assignee: LSI Logic Corporation, Milpitas, Calif.

[21] Appl. No.: 09/207,811

[22] Filed: Dec. 9, 1998

[51] Int. Cl.[7] .................................................. H03M 7/00
[52] U.S. Cl. ........................................................... 341/76
[58] Field of Search .................................. 341/76, 77, 87; 348/415

[56] References Cited

U.S. PATENT DOCUMENTS 5,293,229  3/1994  Iu ............................................. 348/415

FOREIGN PATENT DOCUMENTS 0 696 874 A2   2/1996   European Pat. Off. .

*Primary Examiner*—Brian Young

[57] ABSTRACT

In order to reduce memory bandwidth when predicting B-frames from stored anchor frames in an MPEG-2 video decoder, memory access requests (20) to external memory (14) storing anchor frames are selectively suppressed (18) so that only data is accessed which is required for the current data to be displayed. To still further reduce memory bandwidth, a prediction type (frame picture-frame prediction-half pel filtering) which requires a large number of memory requests is approximated to a type (field prediction) which requires half as many memory requests.

24 Claims, 7 Drawing Sheets

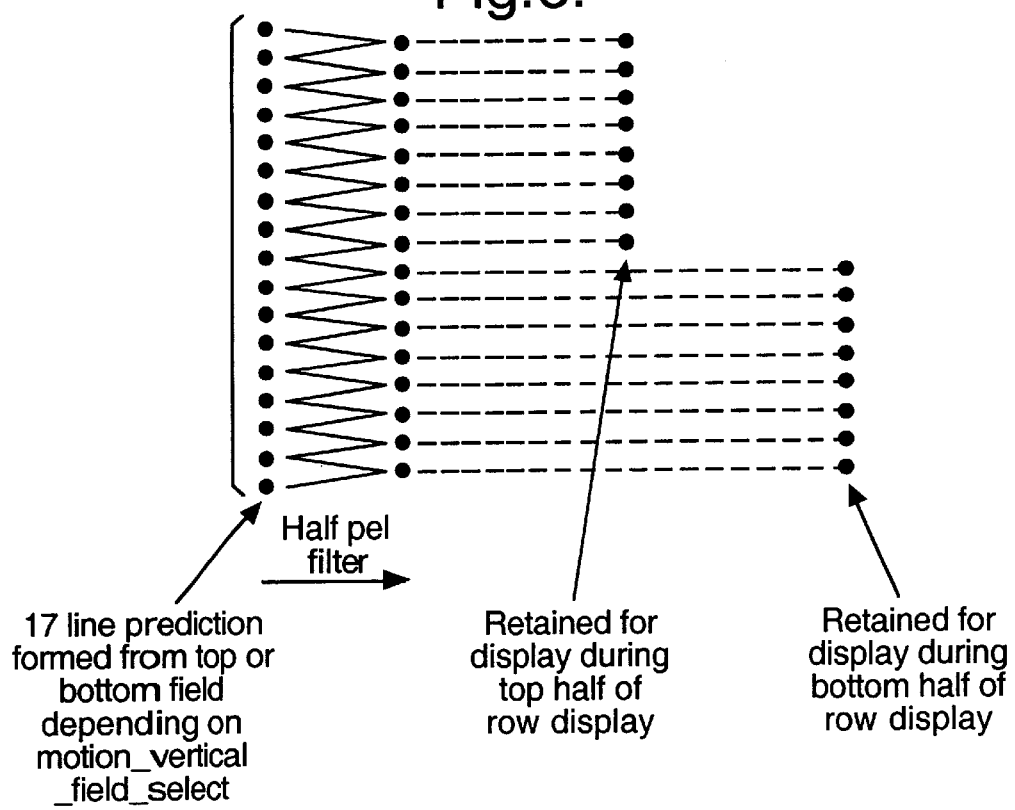
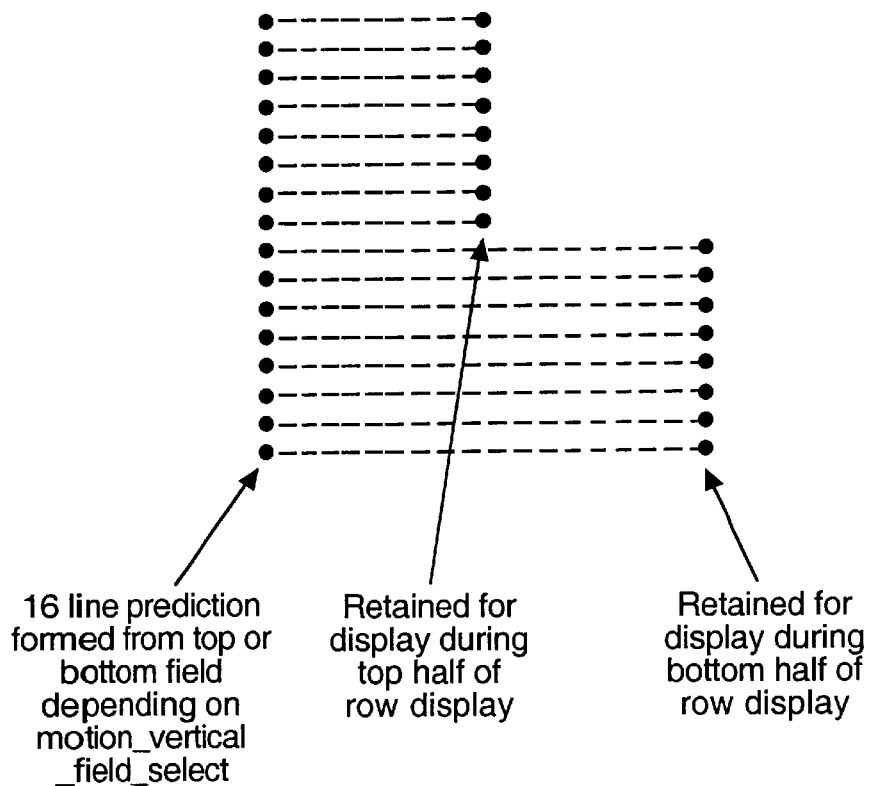

Fig.10.

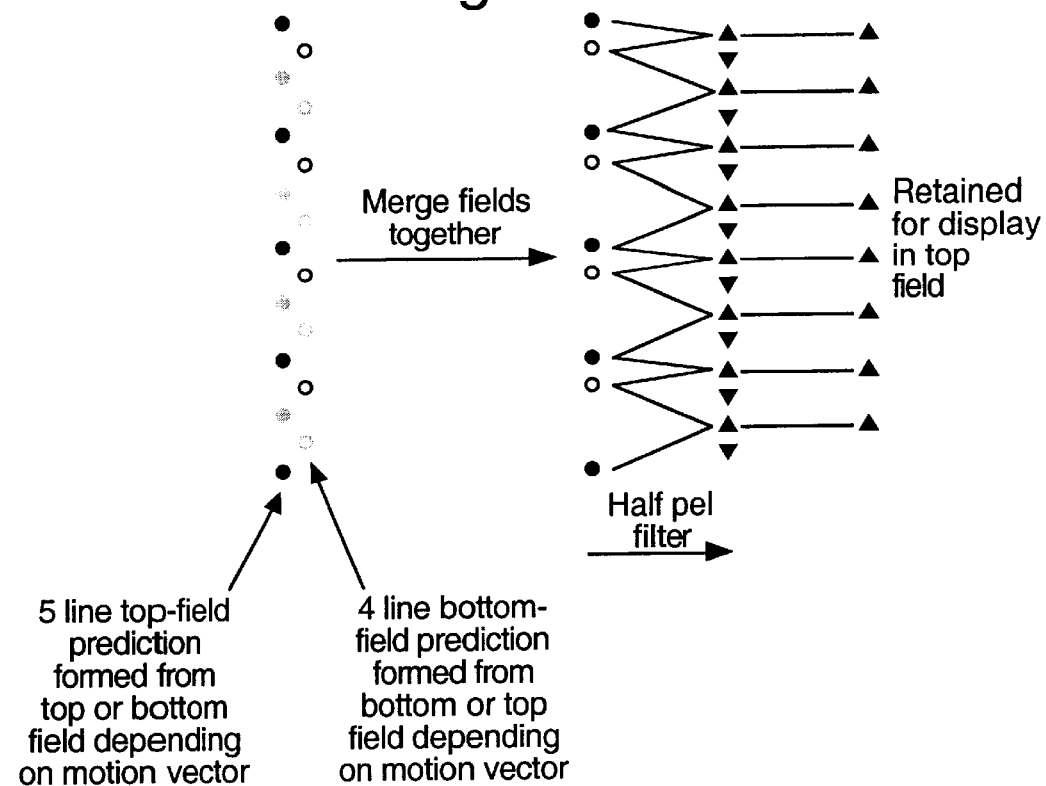

Merge fields together

Retained for display in top field

Half pel filter 5 line top-field prediction formed from top or bottom field depending on motion vector 4 line bottom-field prediction formed from bottom or top field depending on motion vector

Fig.11.

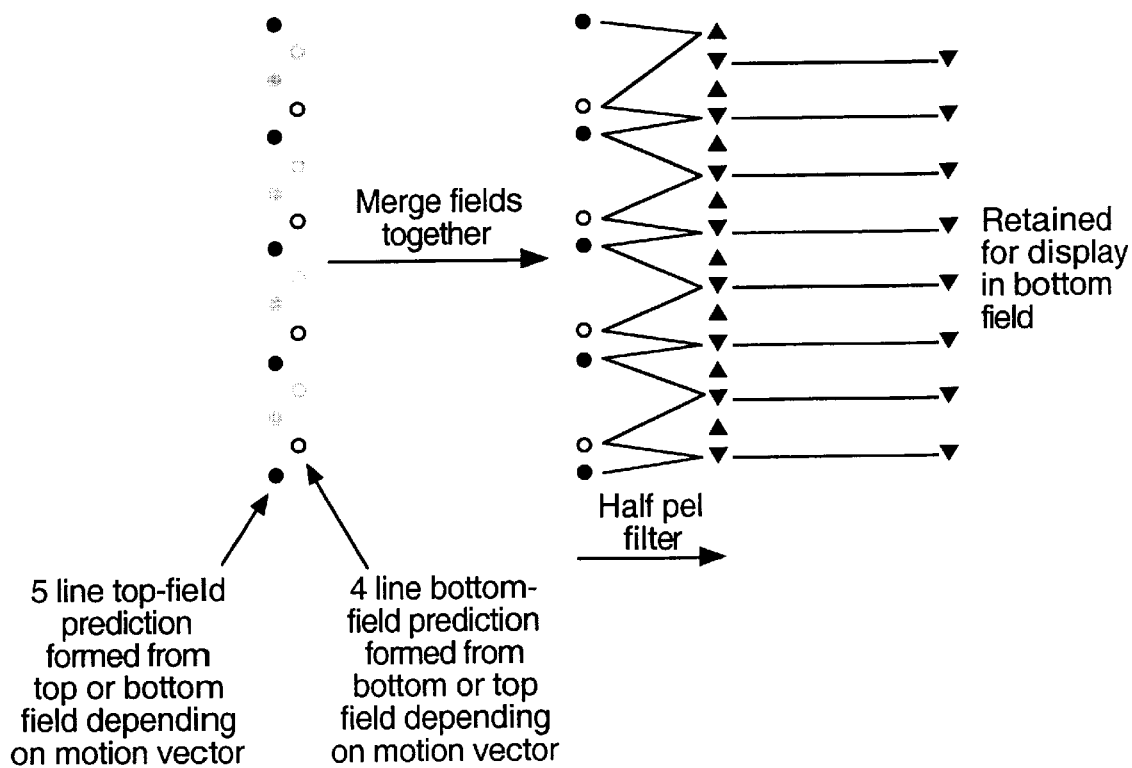

Merge fields together

Retained for display in bottom field

Half pel filter 5 line top-field prediction formed from top or bottom field depending on motion vector 4 line bottom-field prediction formed from bottom or top field depending on motion vector

METHOD AND APPARATUS FOR DECODING VIDEO DATA

This invention relates to method and apparatus for decoding video data and the reduction of memory bandwidth therein, and particularly though not exclusively, decoders according to International Standard ISO/IEC 13818-2 (commonly referred to as MPEG-2 video).

In accordance with customary terminology in the video art, the term "frame" as used herein consists of two fields, which fields are interlaced together to provide an image, as with conventional analog television. The term "picture" is intended to mean a set of data in a bit-stream for representing an image. A video encoder may choose to code a frame as a single frame picture in which case there is a single picture transmitted consisting of two interlaced fields, or as two separate field pictures for subsequent interlacing, in which case two consecutive pictures are transmitted by the encoder. In a frame picture the two fields are interleaved with one another on a line-by-line basis.

Pels ("Picture Elements") usually consist of an 8 bit (sometimes 10 bit) number representing the intensity of a given component of the image at the specific point in the image where the pel occurs. In a picture (field-picture or frame-picture), the pels are grouped into blocks, each block having 64 pels organised as 8 rows by 8 columns. Six such blocks are grouped together to form a "macroblock". Four of these represent a 16 by 16 area of the luminance signal. The remaining two represent the same physical area of the image but are the two colour difference signals (sampled at half the linear resolution as the luminance). Within a picture the macroblocks are processed in the same order as words are read on the page i.e. starting at the top-left and progressing left-to-right before going to the next row (of macroblocks) down, which is again processed in left-to-right order. This continues until the bottom-right macroblock in the picture is reached.

MPEG video is composed of a number of different types of pictures, or, more properly, frames, denoted as (a) I-frames (Intra Frames) which are compressed using intraframe coding and do not reference any other frames in the coded stream;

(b) P-frames Predicted Frames) which are coded using motion-compensated prediction from past I-frames or P-frames; and (c) B-frames (Bidirectionally Predicted Frames) which provide a high degree of compression and are coded using motion-compensated prediction from either past and/or future I-frames or P-frames.

The present invention is particularly concerned with the decoding of B-frames, and for the purposes of this specification the I-frames and P-frames may be viewed as equivalent to one another and will be referred to herein collectively as "anchor frames". According to the MPEG-2 standard, it is necessary to maintain two decoded anchor frames, which are used to form predictions, a forward prediction and a backward prediction, when decoding B-frames.

Our co-pending British application 9716293.7 describes B-frame decoding, using two "anchor" frames, and is primarily concerned with the use of an on-chip buffer for decoding video for display (in preference to using external memory), in order to reduce memory requirements.

EP-A-0732857 describes, among other things a circuit to monitor the rate of decoding. In the case that the decoder is not progressing sufficiently quickly the prediction is modified by replacing the bidirectional prediction by a forward (only) prediction, reducing the memory bandwidth, whilst operating in that mode, and allowing the decoder to "catch up". This method only reduces the bandwidth in a "panic" situation. It is very difficult to make bandwidth allocation decisions in this case. In contemporary video decoding systems the memory bandwidth is not exclusively available for the video decoder. Instead it must be shared by other devices, in particular it is common to have a general purpose CPU share the memory space.

Ideally the CPU utilises whatever spare bandwidth is available once sufficient bandwidth has been used by the real-time tasks, including video decoding. However, in EP-A-0732857, the video decoder will not switch into a lower bandwidth mode of operation until it is forced to by being unable to decode quickly enough. If the priority scheme is such that the video decoder always takes priority over the CPU then it is unlikely to find itself in the situation that it forces it to switch into a lower bandwidth mode. Conversely, if a certain bandwidth is reserved for the CPU, the video decoder may find itself forced into a "panic" mode unnecessarily, because it happens that the CPU did not actually use all of its reserved bandwidth.

A further disadvantage is that in the panic mode the decoder makes only forward predictions in place of bidirectional predictions. This inevitably results in a loss of picture quality, which is probably acceptable in a "panic" situation because the effect is only transient. However, in a system where the reduced bandwidth operation is more commonly entered (in order to free up the bandwidth for other devices such as the CPU) the loss in picture quality would become serious. The use of forward prediction only is a fairly crude approximation to the correct prediction.

Hence, further measures for reduction of memory bandwidth are desirable.

SUMMARY OF THE INVENTION

The present invention is based on the realisation that when forming predictions for B-pictures in an MPEG-2 system, modes for forming predictions, in particular a mode where the decoder decodes the entire B-frame in every field period, make unnecessary memory requests for access to the anchor frames. By eliminating these unnecessary requests, a significant reduction in memory bandwidth requirements can be achieved.

The present invention provides in a first aspect a video decoder including prediction means for forming predicted frames from anchor frames, the prediction means including memory addressing logic receiving input data from a current bit stream and generating in response thereto memory access requests for data of the anchor frames stored in external memory, and including buffer means and filter means for receiving data from external memory, and including memory request suppression means for suppressing unnecessary memory requests, comprising means responsive to the current prediction type being employed, and determining which memory requests from the addressing logic are necessary in order to form the current prediction for display, and which memory requests are to be suppressed for data which will not be used in the current picture data to be displayed.

In a further aspect, the invention provides a method of decoding video including forming predicted frames from anchor frames stored in memory, comprising receiving input data from a current bitstream and accessing in response thereto data of said anchor frames stored in memory in order to generate prediction data, wherein only data of said anchor frames is accessed which is required for the current prediction picture data being displayed.

It will be shown that there is one prediction case where suppression of memory requests of requirements is not possible. However it has been discovered that approximating such prediction case by using a similar prediction where memory requests can be suppressed does not seriously degrade picture quality. In a subsidiary feature of the invention therefore there is provided prediction approximation means coupled so as to selectively alter the prediction type before passing the data to the prediction logic.

As will become clear below, these measures provide significant reduction in memory bandwidth.

BRIEF DESCRIPTION OF THE DRAWINGS

A preferred embodiment of the invention will now be described with reference to the accompanying drawings, in which:

FIGS. 2 to 10 are schematic diagrams of frame predictions including half pel filtering;

FIGS. 11, 11A and 11B are more detailed block diagrams of the request suppression means and prediction approximation means of FIG. 1.

DESCRIPTION OF THE PREFERRED EMBODIMENTS

Figure 1:
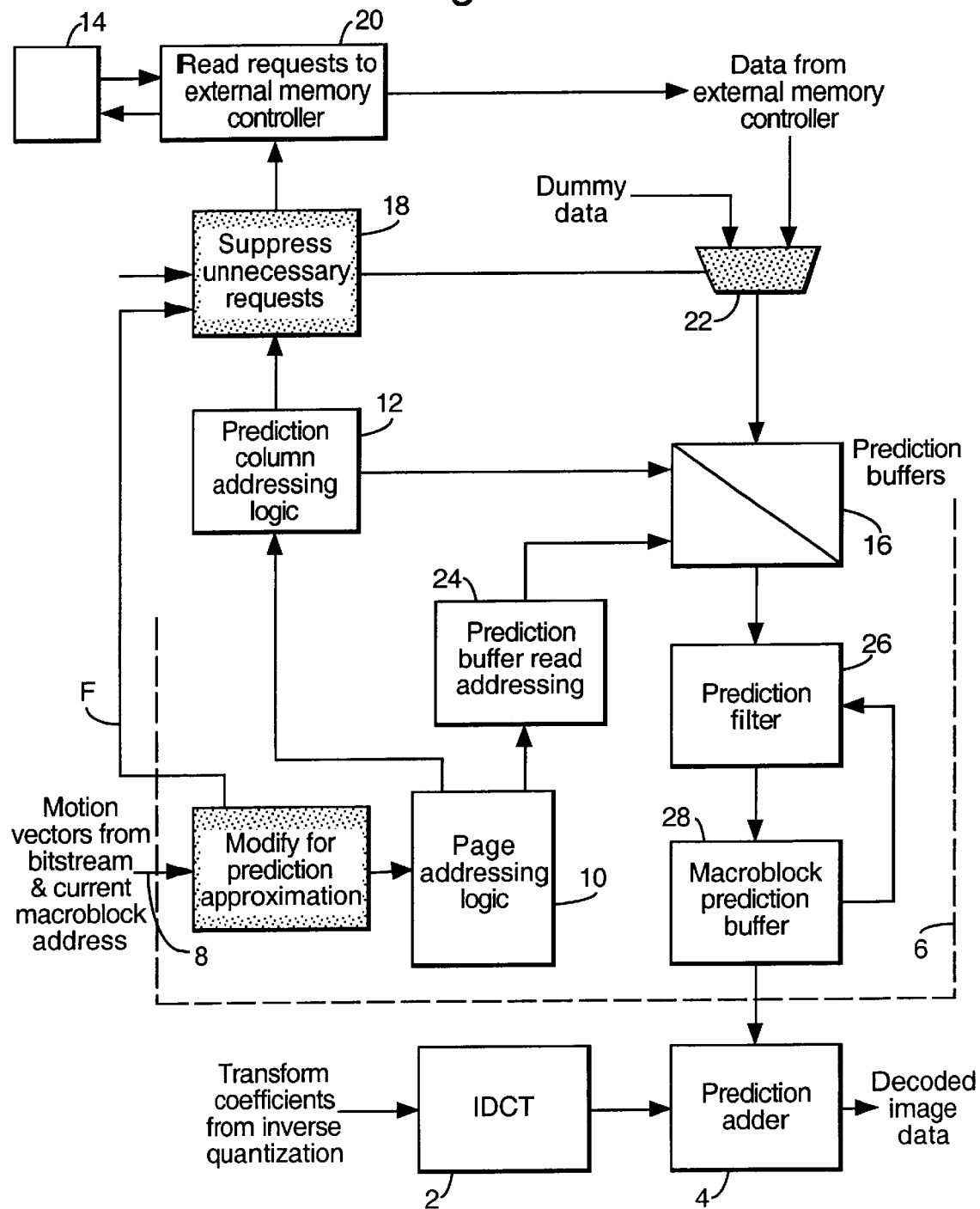
FIG. 1 is a block diagram of part of a video decoder forming a preferred embodiment of the invention.

Referring to the drawings, FIG. 1 is a schematic block diagram of a decoder for producing B-frames, from forward and backward predictions using anchor frames in external memory. FIG. 1 shows in general prediction addressing logic, logic to buffer prediction data, filter it and add it to the prediction error signal derived from an IDCT.

Transform coefficients from inverse quantisation are fed in known manner to an inverse discrete cosine transform (IDCT) unit 2, which derives a prediction error signal for the macroblock of the B frame picture under construction. The error signal is added in a summer 4 to prediction data from prediction logic 6 (indicated in chain lines).

Prediction logic 6 receives at an input 8, in known manner, from the current macroblock being processed, motion vectors from the bit stream and the current macroblock memory address. Such data is fed for modification where necessary to prediction approximation unit 8, as will be described with reference to FIG. 11B. The modified data is passed to page addressing logic 10 which takes motion vector information from the bit stream, together with the knowledge of which macroblock is currently being processed (typically maintained in a counter arrangement, (not shown)) and forms a series of prediction requests, one memory page at a time. These are passed to a Prediction column addressing logic 12 which is responsible for calculating a series of addresses for external memory 14 (storing anchor frames) and addresses for internal Prediction buffers 16. The addresses for the external memory are passed via a memory request suppresser 18 (described below with reference to FIG. 11A) to an external memory controller 20 which arranges to read the required information from the external memory 14. The data is fed from memory 14 via a data gate 22 (described in greater detail below) and stored in the Prediction buffer 16 at locations given by the Prediction column addressing logic 12.

Once suitable prediction data has been assembled in the buffer 16, a Prediction buffer read addressing logic 24 forms a series of addresses to read data from the prediction buffer as required by a prediction filter 26, of a form required by the MPEG-2 standard.

The prediction filter 26 filters the data appropriately for half-pel offsets (both horizontally and vertically) before storing it in a macroblock prediction buffer 28. If prediction interpolation is required, either in the case of B-pictures for a forward and backward prediction, or in the case of dual-prime for predictions of the same and opposite parity, then the second predictions are added into data in the Macroblock prediction buffer 28.

Once the prediction data for the macroblock is available in buffer 28 it is added in summer 4 to the data calculated in the IDCT, to complete the decoding process.

It will be appreciated that, as shown in Table 1, when forming a predicted B-frame, there are various cases, in fact eight cases to considered. There are two picture structures, frame and field, each of which has two principal prediction types which may be selected on a macroblock-by-macroblock basis. In the case of frame pictures these are frame and field prediction, in the case of field pictures field and 16×8 prediction. In all cases a vertical half-pel filter may be called for, or not, depending on the LSB of the vertical motion vector. The choice of prediction type is made, by the encoder, based on the most efficient way to encode the particular macroblock. Typically this reflects the amount of movement locally present in the picture. So in a frame picture, frame prediction is likely to be chosen in areas of little motion, whilst field prediction is likely to be chosen where there is significant movement between the two fields in the frame.

In both picture types a third "prediction type" called "dual prime" is often discussed, however this is simply field prediction, the distinction being in the way in which motion vectors are encoded in the bit stream, not in the way that the resulting predictions are formed in the decoder. Furthermore, "dual prime" cannot be used in B-pictures.

Table 1 Prediction types and action required

| Picture structure | Prediction type | Vertical half pel | Action |
|---|---|---|---|
| Frame | Frame | 1 | Both fields of the predicition are required in order to filter between them to form the half-pel prediciton. |
| | Frame | 0 | Form either the top or bottom field of the prediciton. |
| | Field | 1 or 0 | Form the prediction for only the specific field which is required. |
| Field | Field | 1 | Read from memory the 9 lines for either the upper or lower half of the prediction as required. |
| | Field | 0 | Read from memory the 8 lines for either the upper or lower half of the prediction as required. |
| | 16 × 8 | 1 or 0 | Form the prediciton for only the specific half of the prediciton (upper or lower) which is required. |

The reduction or optisation of memory bandwidth in accordance with the invention is based on noting that in 2-frame decoding (of B-pictures) half of every macroblock is usually discarded during display. In B-frames either the top or bottom field of the resulting macroblock is discarded (while displaying the opposite field). In B-fields either the upper or lower half of the macroblock is discarded in an 8-line block-to-raster buffer (unless a 16-line block-to-raster buffer is used, in which case the picture is only decoded once in any case and there is no prediction optimisation to be gained). Since half the macroblock is to be discarded there is no point in forming the prediction for that half of the macroblock. In most cases this translates into not needing to read approximately half of the prediction from memory.

Of the eight cases noted in Table 1 just one case cannot be optimised, this is the first one listed; frame prediction in a frame picture with vertical half-pel prediction. It is illustrated in FIG. 2 where it can be seen that both of the resulting display fields depend on both prediction fields so both must be read from memory.

Figure 2:
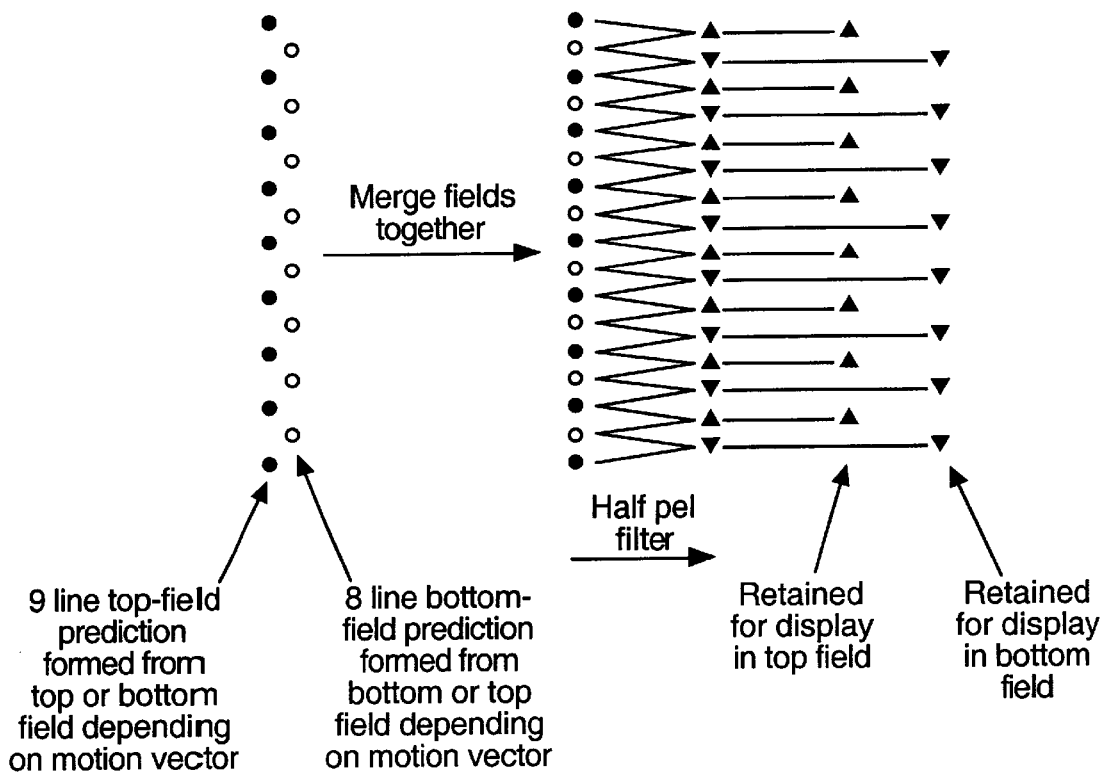

FIG. 2—Frame—Picture Structure—Frame Prediction half-pel vertical filter

As shown in FIG. 2, data from two fields are required, a first field with pels in top lines, and a second field with pels in bottom lines; single pels from the interlaced fields are shown at the left in FIG. 2, with upper pels in solid and lower pels shown as circles. 9 line top-field prediction is formed from top or bottom field depending on motion vector, and 8 line bottom-field prediction is formed from bottom or top field depending on motion vector.

As shown in the table, a flag for vertical half pel filtering is set, as indicated by the least significant bit of the motion vector. This requires as shown at the right hand side of FIG. 2, that an averaging process be carried out between the adjacent pels in a column so as to generate values, indicated by upper and inverted solid triangles which represent intensity values at half pel positions. The upper triangles are retained for display in the top field, whereas the inverted triangles are retained for display in the bottom field.

FIG. 3

Frame picture structure—frame prediction type—no vertical half pel filtering

Figure 3:
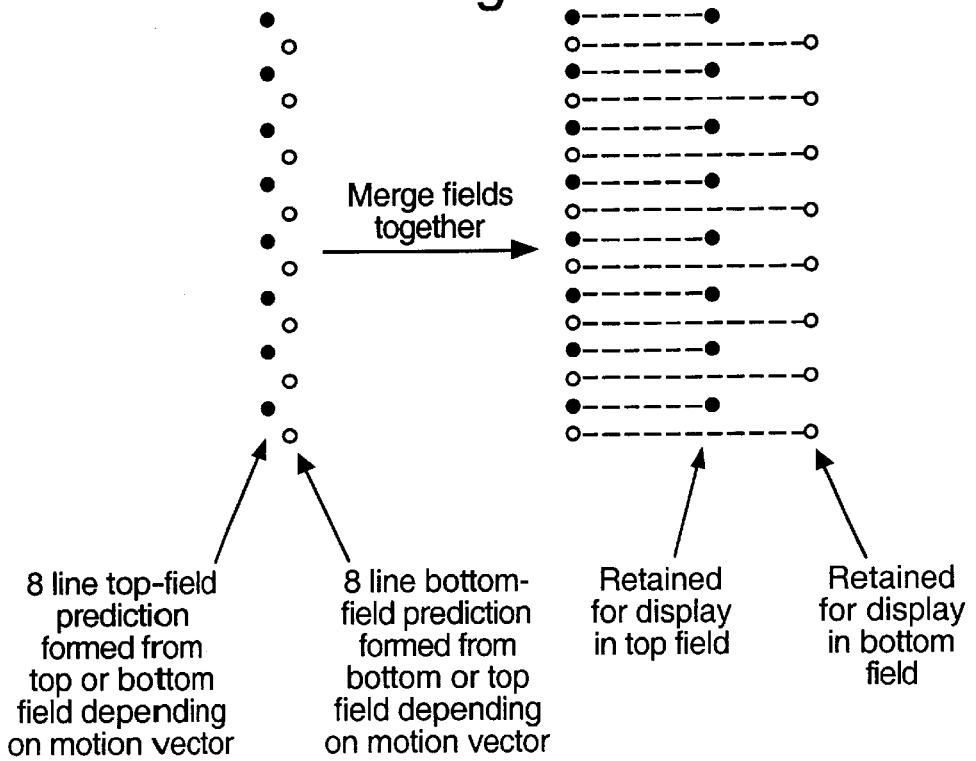

As shown in FIG. 3, the arrangement is similar to that of FIG. 2, except that no filtering action is required. Therefore, when the fields merged together as shown at the right of FIG. 3, no half pel values are created and the bottom field prediction lines are retained for display in the bottom field and the upper field prediction lines are retained for display in the top field.

In use of the video decoder in a frame picture, the decoder will first provide the upper field for display and then the lower field for display, as with conventional television. Thus, it has been the practice, once the fields of FIG. 3 are formed, to discard the bottom field in the first period of display and then discard the upper field in the second period of display. In accordance with the invention, it has been realised this creates a redundancy in accessing external memory and that when forming a prediction for the upper field, there is no need to access data for the lower field, and vice versa. In accordance with the invention, such accesses are suppressed, as will become clear below.

FIG. 4

Frame structure—Field prediction—half pel vertical filter

Figure 4:
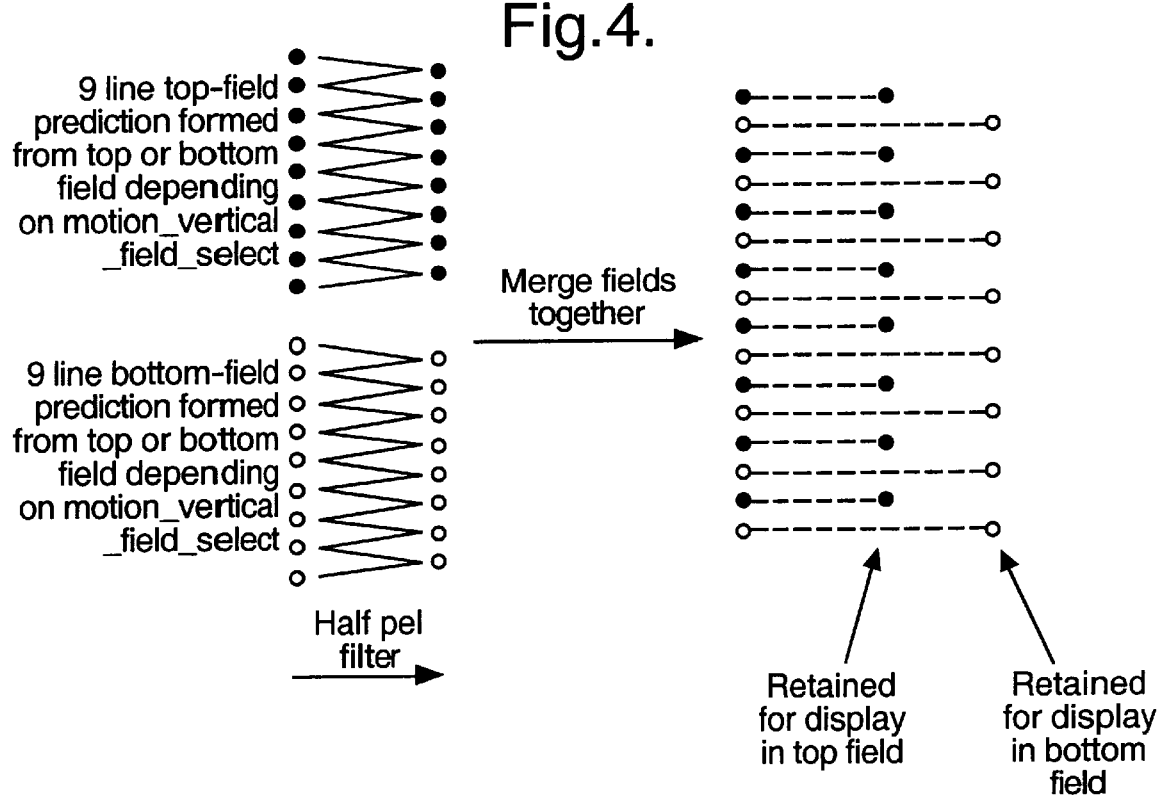

As shown in FIG. 4, with this arrangement, half-pel vertical filtering is required, but because the motion vectors are such that filtering is effected with values from respective fields, as shown in FIG. 4 at the left thereof, the half pel values are derived by averaging adjacent values of the respective top or bottom fields. The fields are then merged together as indicated at the right of FIG. 4.

Clearly, this is an arrangement similar to FIG. 3 in that the two fields are separate from the point of view of display and it is a redundant measure to access the bottom fields in external memory when creating predictions, and then subsequently displaying, data for the upper field. Thus, in accordance with the invention, memory accesses for the bottom field are suppressed when creating data for the upper field, and vice versa.

FIG. 5

Frame structure—Field prediction—no vertical filtering

Figure 5:
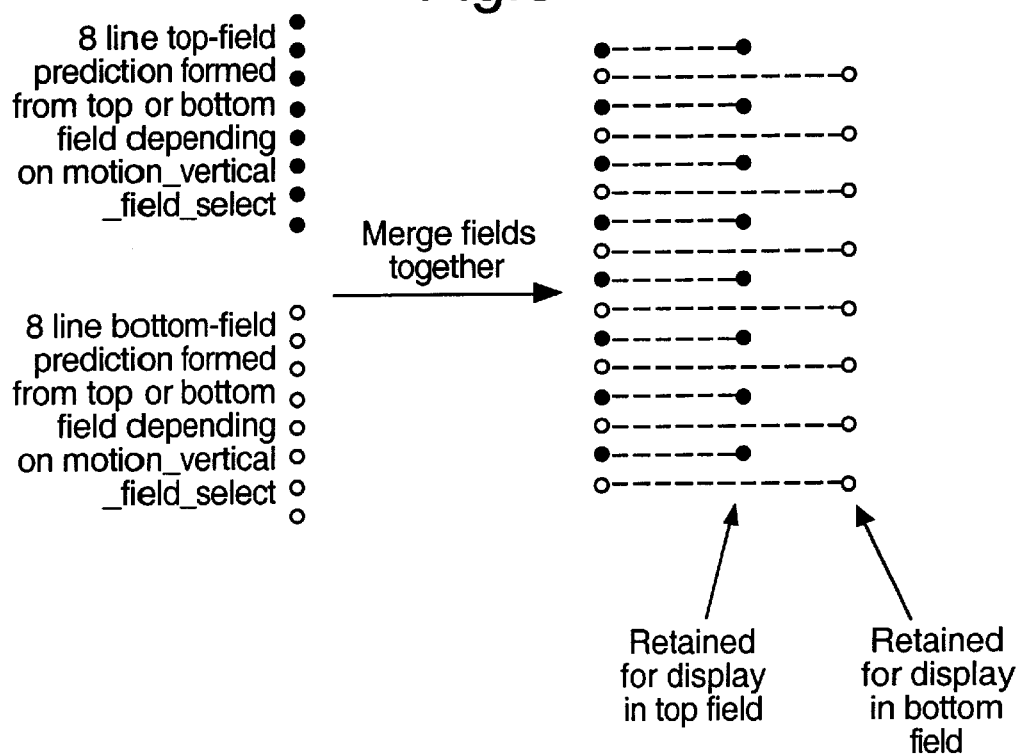

As shown in FIG. 5, the upper fields and lower fields are accessed and then merged. However, as with FIGS. 3 and 4, the accessing of the bottom values of the anchor picture in external memory is redundant when the upper field prediction values are created and displayed. Thus, accesses for the bottom field values are suppressed when creating values for display for the upper field, and vice versa.

FIG. 6

Field picture structure—Field prediction type—vertical half pel filtering

As shown in FIG. 6, the picture structure is that of a single field, and half pel values are created from adjacent values of that field.

As particularly described in our co-pending application 9716293.7, the decoded data for display is placed in a buffer which may either be 8 lines high or 16 lines high. In the case where the buffer is 16 lines high, all the data of FIG. 6 will be forwarded immediately through the buffer for display. However, in the case where an 8 line high buffer is used, which has certain advantages as particularly described in our co-pending application, then either the upper lines or the lower lines are discarded while the other half is displayed, and in a second decoding action, the other half is displayed whilst the first half of data is discarded. Thus, in this case, for an 8 line buffer, only memory access requests for the corresponding upper half of data from the anchor frames or lower half of data from the anchor frames are permitted, whilst the remaining memory access requests are suppressed.

FIG. 7

Field structure—Field prediction—without vertical half pel filtering

As shown in FIG. 7, the arrangement is similar to that of FIG. 6, except that filtering is not required. Thus, similar considerations apply, and only memory access requests are permitted for the upper half of the macroblock in a first period of display, whilst the other memory requests are suppressed, and in a second period of display, memory access requests for the upper half are suppressed whilst memory access requests for the lower half of data are permitted.

FIG. 8

Field picture structure—16×8 prediction type—vertical half pel filtering

In this arrangement, the macroblock is divided into two halves, depending on the values of the motion vectors in the two halves. The upper half has half pel values created from adjacent values of the pels, and similarly half pel values for the lower half of the macroblock are created from adjacent values of the bottom field lines. The data for the upper block including the filtered values is displayed in a first cycle, and the data for the lower half including the interpolated values is displayed in a second display cycle. Thus, memory access requests for the bottom half data are suppressed while the top half of data is displayed, and vice versa.

FIG. 9

Field picture structure 16×8 prediction type—no vertical filtering

Figure 8:
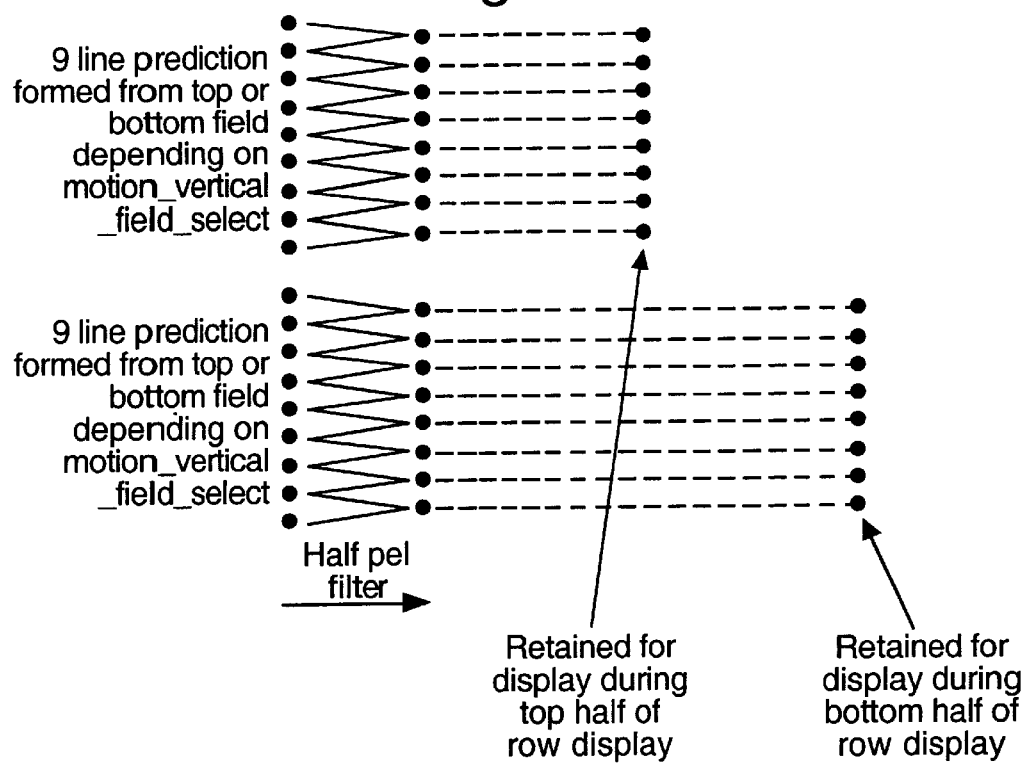

This arrangement is similar to FIG. 8, except that no vertical half pel filtering is required, and similar considerations to those of FIG. 8 apply.

Figure 9:
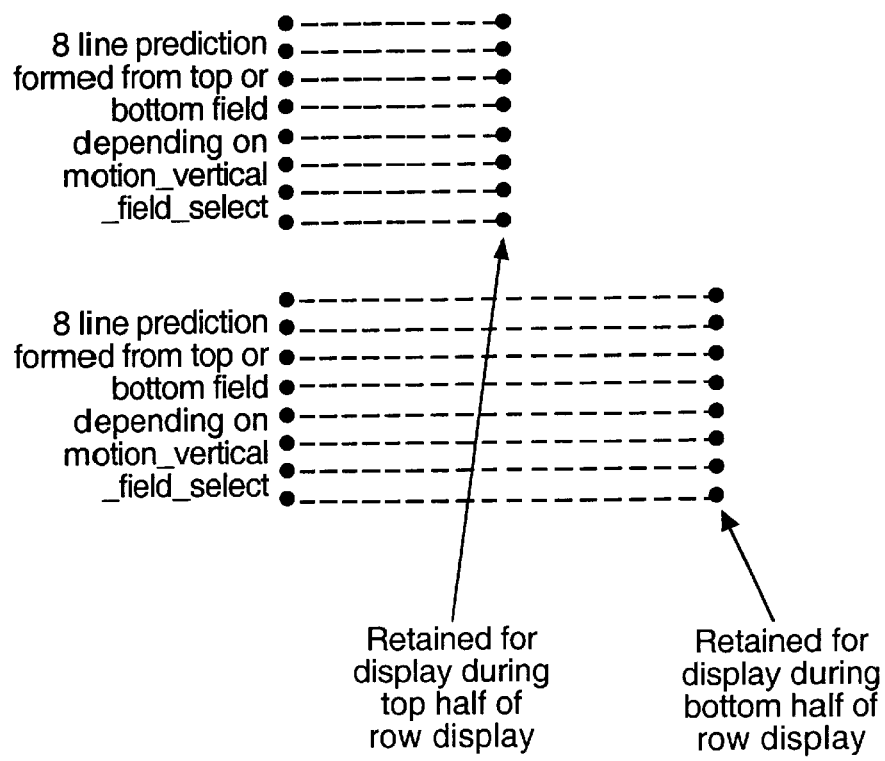

FIGS. 8 and 9 illustrate the case where the selection of half-pel filtering is the same in the upper and lower regions of the prediction. Since the selection is made by the least significant bit of the motion vector, and each of the two regions (upper and lower) has its own motion vector, it is possible for the upper region to use half-pel filtering while the lower region does not, and vice versa.

Thus, reviewing the cases illustrated in FIGS. 2 to 9, it may be seen that with the chosen implementation, only the arrangement of FIG. 2 requires memory accesses for two sets of data and for the remaining cases, accessing of half the data previously required is redundant.

Figure 11A:
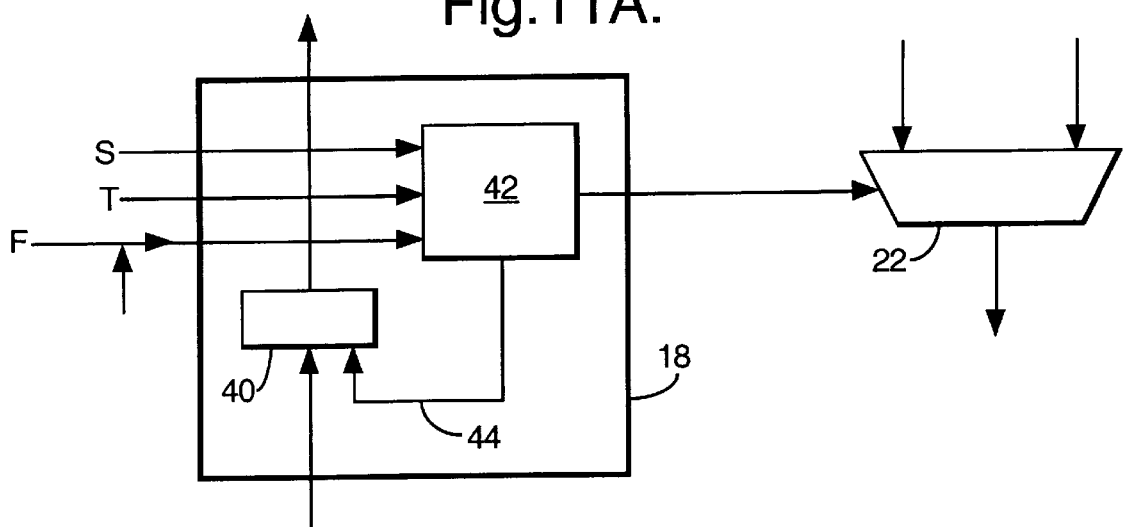

Thus, in accordance with the invention, the arrangement shown in FIG. 11A is employed, which shows in more detail the units 18 and 22 of FIG. 1, and in particular the request suppression unit 18 as comprising a gate 40 controlled from a look-up table 42. Look-up table 42 receives data indicating the current prediction being carried out and in particular the picture structure employed S, the prediction type T, whether it be frame, field or 16×8, and whether vertical half pel filtering is required F, indicated by the least significant bit of the motion vector. Thus, look-up table 42 essentially contains a table as shown in FIG. 1 and provides at appropriate times during the prediction control signals on line 44 to open or close gate 40 to permit memory requests where necessary and to suppress unnecessary requests.

When unnecessary requests are suppressed, a further control signal is provided on line 46 to permit dummy data to be provided via gate 22 instead of data from memory 14. The value of the dummy data is not important since it will never (in a properly functioning system) affect picture information which will be viewed. However, it is helpful in the development of the system to have a value which is easily recognised as having been generated by prediction optimisation. A suitable value would by 0×80 (128 decimal) for all bytes, in all colour components, which corresponds to a mid grey.

Implementing the optimisations detailed above has the effect of freeing up bandwidth for use by CPU. There is a slight reduction in the worst-case prediction of FIG. 2. Compared against the worst case bandwidth for decoding the B-frames twice over, which has a worst case bandwidth of two 9-line (luma) predictions for both field prediction in frame pictures and 16×8 prediction in field predictions, because previous calculations of bandwidth have allowed for two nine-line predictions whereas with this scheme a maximum of seventeen lines need be read. However this reduction by a factor of 1/18 is not of much significance.

One might expect a significant reduction in prediction bandwidth, on the average, because only one of eight cases requires the dual reading of data.

This is, unfortunately, unlikely to be realised. Most bit streams use predominantly or exclusively frame pictures. The frame prediction will be chosen in many cases. The half-pel predictions are chosen preferentially over integer pel prediction in many encoders because of the low-pass filtering effect of the half-pel filter. An average of half of the macroblocks are estimated to take advantage of the optimisations. Since there are other calls on memory bandwidth (for instance the VLC data being supplied from the channel buffer to the Huffman decoder) this should yield a saving in the region of ten percent in memory bandwidth.

Such benefit of a reduction on the average bandwidth used is desirable. However the benefit of reducing the worst-case bandwidth is more valuable. If the worst-case bandwidth could be reduced (the arrangement of FIG. 2) then that bandwidth could be used to service real-time requirements.

It is noted that the decoded B-pictures are not themselves used to form predictions for subsequent pictures. It therefore follows that it may be possible to form an approximate prediction for the arrangement of FIG. 2 rather than the precise prediction demanded by the MPEG standard.

A number of possibilities exist for the approximation.

1. Form an integer pel prediction (since as in FIG. 3 this can then be optimised, because in decoding each individual field, prediction data would be taken from only one of the two fields). In the case that an integer pel prediction is to be used there are various ways to decide which of the two candidates (on either side of the correct half pel prediction) are to be chosen. A number of possibilities exist:

(a) Truncate towards negative infinity (i.e. simply force the half-pel flag to zero)

(b) Any of a range of common rounding procedures; round towards positive infinity, round towards zero, round away from zero, round towards even, round towards odd etc.

(c) Choose at random

2. Take same data from each field and interpolate the missing data.

FIG. 10 shows one possible arrangement. In each field period only every other line of each of the predictions is read from external DRAM.

As a result of video simulations (comparing the picture quality resulting from various prediction approximations) it is clear that a very simple prediction approximation actually gives the best picture quality. It has been demonstrated that forming integer-pel predictions gives more acceptable results than interpolating from both fields on all the types of video material on which tests were conducted. The preferred technique for selecting which integer pel vector to use is therefore simply to force the half-pel flag to zero. This is extremely simple and gives very acceptable pictures.

Figure 11B:
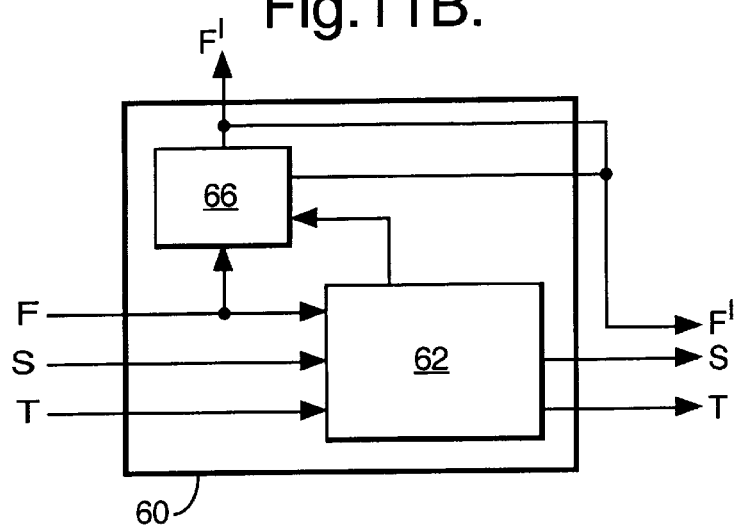
Figure 12:
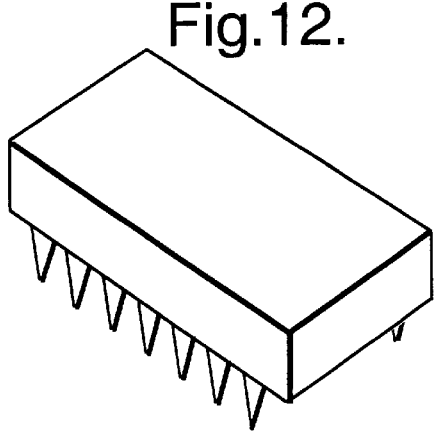
FIG. 12 is a schematic view of a chip incorporating the decoder of FIG. 1.

Referring now to FIG. 11B, this shows the prediction unit 60 of FIG. 1 in more detail. Unit 60 contains a look-up table 62, containing the data of table 1 and receives data indicating the current type of prediction required. When the current type of prediction is that of FIG. 2, namely, a frame structure with frame prediction type with vertical half pel filtering, look-up table 62 provides a control signal on line 64 to a gate arrangement 66, which receives the incoming bit stream. Gate 66 has the effect of forcing the least significant bit of the motion vector to zero, and therefore changes the filtering flag to zero, indicating no filtering is required (F'). The data applied to the look-up table of unit 18 is accordingly changed, and hence for the arrangement of FIG. 2, the prediction type is changed to that of FIG. 3 wherein no filtering is required.

In a real implementation, prediction approximation may be selectable by the "user" (usually some computer program controlling the operation of the video decoder) allowing a choice to be made between lower bandwidth, with approximated pictures, or higher bandwidth and perfect decoding The choice might even be made dynamically, perhaps as a function of some application knowledge. For instance if the application is drawing complicated graphics it may select the lower bandwidth option in the video decoder to make bandwidth available to the CPU. At other times it may choose the perfect decoding option.

It may be possible to apply the approximation adaptively. For example, if the macroblock in question forms both forwards and backwards predictions then it is will be using close to the maximum memory bandwidth for forming predictions. Conversely if it forms only a forward or a backward prediction then it is sure that only of the order one half of the worst case bandwidth will be used. In this case we can choose to not approximate the prediction. Effectively the bandwidth which is available because of not forming either the backward or forward prediction may be redeployed to forming the perfect prediction in the remaining direction.

In a preferred embodiment, as a result of video simulations (comprising the picture quality resulting from various prediction approximations), it is clear that the best picture quality is provided by an approximation involving forming integer-pel predictions. This gives more acceptable results than interpolating from both fields on all the types of video material on which tests were conducted.

The preferred technique for selecting which integer-pel vector to use is simply to force the half-pel vector to zero. This is simple and gives very acceptable pictures.

It is clear that the adaptive approximation will yield results that are no worse than those using the simple integer pel prediction. The approach taken is to only approximate the prediction if a prediction in the opposite direction is also formed. Specifically:

(a) If the forward prediction is frame-based and has the vertical half-pel flag set to '1' then it is approximated (by forcing the vertical half-pel flag to zero) if the macroblock also forms a backward prediction.

(b) If the backward prediction is frame-based and has the vertical half-pel flag set to '1' then it is approximated (by forcing the vertical half-pel flag to zero) if the macroblock also forms a forward prediction.

Note that the type of prediction in the opposite direction is unimportant, just that it forms one at all is enough to cause the approximation to occur.

The advantage of this conditional technique is that the case that a macroblock forms both a forward and a backward prediction is less likely to occur than it forms one or the other. By only approximating those cases where both the forward and backward prediction is formed it follows that more of the image is statistically likely to be formed with the "perfect" prediction. Despite this the maximum prediction bandwidth has been "capped" at a value approximately one half of that which would otherwise be the case. Limiting the worst-case bandwidth is of great value since a reliable design must support the worst case requirement however unlikely it is to occur in practice.

Thus, it may be seen that prediction approximation reduces the worst-case prediction bandwidth to about 8/17 of its previous value. This reduces the worst case memory bandwidth required for decoding by something of the order 40 Mbyte/s (for MP@ML).

Hence, as regards advantages of the invention, prediction optimisaton (without approximation) gives a useful reduction in the bandwidth used to decode B-pictures in a two framestore decoder which frees bandwidth in many cases for use by other devices which share the same memory as the video decoder.

Prediction approximation gives a reduction in bandwidth used to form predictions which cannot be optimized to the same order as that required for the optimised predictions. This therefore gives (together with prediction optimisation) a reduction in the worst-case bandwidth required for decoding any bitstream.

There are various ways of constructing a decoder according to the invention.

For example, the decision about which data is to be discarded could be made earlier. In particular it may be possible to avoid decoding some blocks of data entirely if they are coded in a certain way. For example, in a frame B frame-picture, where the top field is being decoded and the bottom discarded. If dct_type=1 for a macroblock, then not only can the prediction be optimised (or approximated) as described, but there is no need to perform any processing for (luminance) )blocks 2 and 3 beyond parsing (and thereafter) ignoring the DCT coefficient data. This is because only blocks 0 and 1 will be used. Similar savings may be made in other cases.

What is claimed is:

1. A video decoder including prediction means for forming predicted frames from anchor frames, the prediction means including memory addressing logic receiving input data from a current bit stream and generating in response thereto memory access requests for data of the anchor frames stored in external memory, and including buffer means and filter means for receiving data from external memory, and including memory request suppression means for suppressing unnecessary memory requests, comprising means responsive to the current prediction type being employed, and determining which memory requests from the addressing logic are necessary in order to form the current prediction for display, and which memory requests are to be suppressed for data which will not be used in the current picture data to be displayed.

2. A video decoder according to claim 1, including gate means for providing dummy data when the memory access request is suppressed, such dummy data being provided to said buffer means and filter means.

3. A video decoder according to claim 2, including prediction approximation means comprising means responsive to the current type of prediction being generated and for selectively changing the type of prediction to a type which requires less memory access requests.

4. A video decoder according to claim 3, wherein said approximation means includes means for forcing a filtering flag in the data to a value which indicates that no filtering is required.

5. A video decoder according to claim 2, including prediction approximation means comprising means responsive to the current type of prediction being generated and for selectively changing the type of prediction to a type which requires less memory access requests.

6. A video decoder according to claim 5, wherein said approximation means includes means for forcing a filtering flag in the data to a value which indicates that no filtering is required.

7. A video decoder according to claim 6, including an adaptive arrangement wherein said memory requests suppression means is only effective where bidirectional prediction is required.

8. A video decoder according to claim 6, including an adaptive arrangement wherein said prediction approximation means is only effective where bidirectional prediction is required.

9. A video decoder according to claim 3, including an adaptive arrangement wherein said memory requests suppression means is only effective where bidirectional prediction is required.

10. A video decoder according to claim 3, including an adaptive arrangement wherein said prediction approximation means is only effective where bidirectional prediction is required.

11. A video decoder according to claim 4, including an adaptive arrangement wherein said memory requests suppression means is only effective where bidirectional prediction is required.

12. A video decoder according to claim 4, including an adaptive arrangement wherein said prediction approximation means is only effective where bidirectional prediction is required.

13. A video decoder according to claim 1, including an adaptive arrangement wherein said memory requests suppression means is only effective where bidirectional prediction is required.

14. An integrated circuit chip incorporating a video decoder according to claim 1.

15. An integrated circuit chip incorporating a video decoder according to claim 3.

16. An integrated circuit chip incorporating a video decoder according to claim 7.

17. A method of decoding video including forming predicted frames from anchor frames stored in memory, comprising receiving input data from a current bitstream and accessing in response thereto data of said anchor frames stored in memory in order to generate prediction data, wherein only data of said anchor frames is accessed which is required for the current prediction picture data being displayed.

18. A method according to claim 17, wherein said input data includes information of a current prediction type to be formed, and the method including selectively suppressing memory access requests in dependence on the current prediction type for data which is not to be currently displayed.

19. A method according to claim 18, including approximating at least one predetermined prediction type which requires a relatively large number of memory accesses to a prediction type which requires a relatively small number of accesses.

20. A method according to claim 19, wherein said at least one predetermined prediction type comprises a frame picture with frame prediction and including half pel filtering.

21. A method according to claim 20, including employing the approximation only where bidirection prediction of B-frames is required.

22. A method according to claim 17, including approximating at least one predetermined prediction type which requires a relatively large number of memory accesses to a prediction type which requires a relatively small number of accesses.

23. A method according to claim 22, wherein said at least one predetermined prediction type comprises a frame picture with frame prediction and including half pel filtering.

24. A method according to claim 23, including employing the approximation only where bidirection prediction of B-frames is required.

* * * * *